United States Patent
Park

(10) Patent No.: US 11,858,312 B2
(45) Date of Patent: Jan. 2, 2024

(54) METHOD AND DEVICE FOR CONTROLLING AIR CONDITIONING DEVICE OF ELECTRIFIED VEHICLE

(71) Applicants: Hyundai Motor Company, Seoul (KR); Kia Corporation, Seoul (KR)

(72) Inventor: Sejun Park, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 7 days.

(21) Appl. No.: 17/872,840

(22) Filed: Jul. 25, 2022

(65) Prior Publication Data
US 2023/0182532 A1    Jun. 15, 2023

(30) Foreign Application Priority Data
Dec. 13, 2021    (KR) .................. 10-2021-0177456

(51) Int. Cl.
*B60H 1/00*    (2006.01)
*B60H 1/32*    (2006.01)

(52) U.S. Cl.
CPC ....... *B60H 1/00849* (2013.01); *B60H 1/3211* (2013.01)

(58) Field of Classification Search
CPC ............ B60H 1/00392; B60H 1/00835; B60H 1/00849; B60H 1/3211; B60H 1/3208; B60H 2001/3272; B60H 2001/3277; B60H 2001/3292; B60K 11/08
See application file for complete search history.

(56) References Cited

U.S. PATENT DOCUMENTS

| 2013/0046445 A1* | 2/2013 | Nishimura | B60K 11/085 701/49 |
| 2013/0184943 A1* | 7/2013 | Sato | B60H 1/00871 701/49 |
| 2015/0149043 A1* | 5/2015 | Macfarlane | B60K 11/085 701/49 |
| 2016/0318371 A1* | 11/2016 | Yoshimi | B60H 1/00428 |
| 2016/0368366 A1* | 12/2016 | Miller | F01P 7/12 |
| 2017/0021700 A1* | 1/2017 | Smith | B60H 1/3225 |
| 2018/0022210 A1* | 1/2018 | Matsumura | F01P 7/12 123/41.05 |
| 2023/0158858 A1* | 5/2023 | Kim | B60H 1/00885 62/186 |

FOREIGN PATENT DOCUMENTS

JP    2015-131530 A    7/2015

* cited by examiner

*Primary Examiner* — Marc E Norman
(74) *Attorney, Agent, or Firm* — MORGAN, LEWIS & BOCKIUS LLP

(57) ABSTRACT

A method for controlling an air conditioning device of an electrified vehicle includes determining, by a controller, whether an active air flap is closed in response to an operation signal of the active air flap of the electrified vehicle, when an electric compressor provided in an air conditioner of the air conditioning device of the electrified vehicle is operated, when the active air flap is closed, controlling, by the controller, opening of an intake door provided in the air conditioning device to increase an amount of internal circulating air of the air conditioner, and when the amount of the internal circulating air of the air conditioner is increased, decreasing, by the controller, a speed of the electric compressor.

13 Claims, 3 Drawing Sheets

METHOD AND DEVICE FOR CONTROLLING AIR CONDITIONING DEVICE OF ELECTRIFIED VEHICLE

CROSS-REFERENCE TO RELATED APPLICATION

The present application claims priority to Korean Patent Application No. 10-2021-0177456 filed on Dec. 13, 2021, the entire contents of which is incorporated herein for all purposes by this reference.

BACKGROUND OF THE PRESENT DISCLOSURE

Field of the Present Disclosure

The present disclosure relates to a vehicle. More particularly, the present disclosure relates to a method and a device configured for controlling an air conditioning device of an electrified vehicle.

Description of Related Art

Generally, an air conditioning system (or a heating, ventilation, and air conditioning (HVAC) device) is provided in a vehicle. The air conditioning system includes a cooling system for cooling a vehicle interior (an interior of the vehicle) or a heating system for heating the vehicle interior.

The cooling system includes a compressor, a condenser, an expansion valve, and an evaporator. The heating system includes a pump, a heat-exchanger, and a heating device.

The air conditioning system may maintain an indoor temperature of the vehicle at an appropriate level by operating a heater or an air conditioner while allowing outside air to flow into the vehicle or circulating inside air. In addition to basic heating and cooling, an indoor humidity control function or an airflow control function is added to the air conditioning system by inflow or blocking of the outside air of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and a device configured for controlling an air conditioning device of an electrified vehicle that which may improve fuel efficiency (or electrical efficiency) of the electrified vehicle by controlling the air conditioning device of the electrified vehicle to reduce power consumption of an electric compressor provided in an air conditioner of the air conditioning device when an active air flap (AAF) of the electrified vehicle is closed.

Various aspects of the present disclosure are directed to providing a method for controlling an air conditioning device of an electrified vehicle, including determining, by a controller, whether an active air flap is closed in response to an operation signal of the active air flap of the electrified vehicle, when an electric compressor provided in an air conditioner of the air conditioning device of the electrified vehicle is operated, when the active air flap is closed, controlling, by the controller, opening of an intake door provided in the air conditioning device to increase an amount of internal circulating air of the air conditioner, and when the amount of the internal circulating air of the air conditioner is increased, decreasing, by the controller, a speed of the electric compressor.

The method for controlling the air conditioning device of the electrified vehicle may further include determining, by the controller, whether the electric compressor is operated in response to an operation signal of the electric compressor.

The method for controlling the air conditioning device of the electrified vehicle may further include determining, by the controller, whether the active air flap is opened in response to an operation signal of the active air flap, and when the active air flap is opened, determining, by the controller, whether a pressure of a refrigerant in a condenser of the air conditioner that condenses the refrigerant transferred from the electric compressor is less than a reference value, wherein when the pressure of the refrigerant is less than the reference value, the method for controlling the air conditioning device of the electrified vehicle may be terminated.

Various aspects of the present disclosure are directed to providing a device configured for controlling an air conditioning device of an electrified vehicle, including an active air flap provided at a front side of the electrified vehicle and configured to, by being opened, cool a condenser of an air conditioner condensing a refrigerant transferred from an electric compressor provided in the air conditioner of the electrified vehicle, and a controller configured to determine whether the active air flap is closed in response to an operation signal of the active air flap when the electric compressor is operated, wherein when the active air flap is closed, the controller may be configured to control opening of an intake door provided in the air conditioning device to increase an amount of an internal circulating air of the air conditioner, and when the amount of the internal circulating air of the air conditioner is increased, the controller may be configured to decrease a speed of the electric compressor.

The controller may be configured to determine whether the electric compressor is operated in response to an operation signal of the electric compressor.

The controller may be configured to determine whether the active air flap is opened in response to an operation signal of the active air flap, when the active air flap is opened, the controller may be configured to determine whether a pressure of a refrigerant in the condenser is less than a reference value, and when the pressure of the refrigerant is less than the reference value, the controller may be configured not to increase the amount of the internal circulating air of the air conditioner by controlling the opening of the intake door.

According to the method and the device configured for controlling the air conditioning device of the electrified vehicle according to the exemplary embodiments described above, it is possible to improve fuel efficiency (or electrical efficiency) of the electrified vehicle by controlling the air conditioning device of the electrified vehicle to reduce power consumption of an electric compressor provided in an air conditioner of the air conditioning device when an active air flap (AAF) of the electrified vehicle is closed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
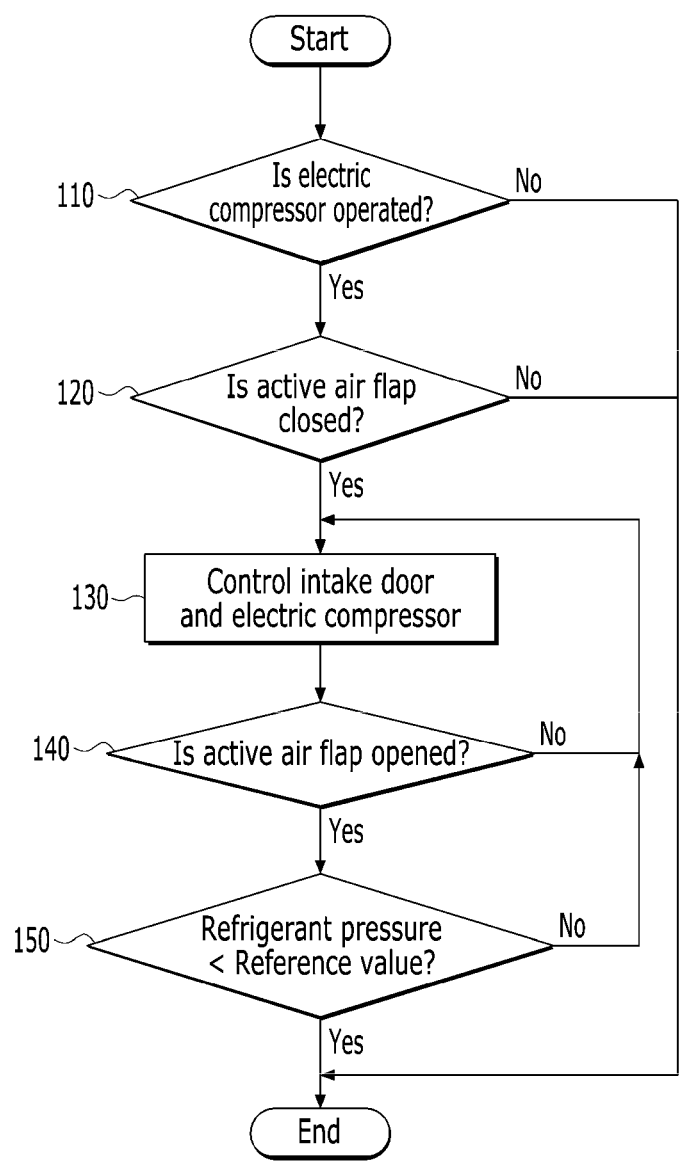
FIG. 1 illustrates a flowchart of a method for controlling an air conditioning device of an electrified vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

To sufficiently understand the present disclosure and the object to be achieved by carrying out the present disclosure, reference needs to be made to the accompanying drawings for illustrating embodiments of the present disclosure and contents included in the accompanying drawings.

Hereinafter, various exemplary embodiments of the present disclosure will be described in detail with reference to the accompanying drawings. In the description of the present disclosure, the specific descriptions of publicly known related configurations or functions will be omitted when it is determined that the specific descriptions may obscure the subject matter of the present disclosure. The same reference numerals shown in the respective drawings may indicate the same constituent elements.

The terms used in the present specification are used only for describing particular exemplary embodiments and are not intended to limit the present disclosure. Singular forms are intended to include plural forms unless the context clearly indicates otherwise. In the present specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

Throughout the present specification, when one constituent element is referred to as being "connected to" another constituent element, one constituent element can be "directly connected to" the other constituent element, and one constituent element can also be "electrically or mechanically connected to" the other constituent element with other constituent elements therebetween.

Unless otherwise defined, the terms used herein, including technical or scientific terms, have the same meaning as commonly understood by those skilled in the art to which an exemplary embodiment of the present disclosure pertains. The terms such as those defined in a commonly used dictionary should be interpreted as including meanings consistent with meanings in the context of related technologies and should not be interpreted as ideal or excessively formal meanings unless explicitly defined in the present specification.

When an air conditioner of an electrified vehicle is operated and when an active air flap (AAF) of the electrified vehicle is closed, air resistance of the vehicle decreases, but cooling efficiency of the air conditioner decreases such that pressure of a refrigerant of the air conditioner increases, thus power consumption of an electric compressor of the air conditioner that compresses the refrigerant increases.

Figure 2:
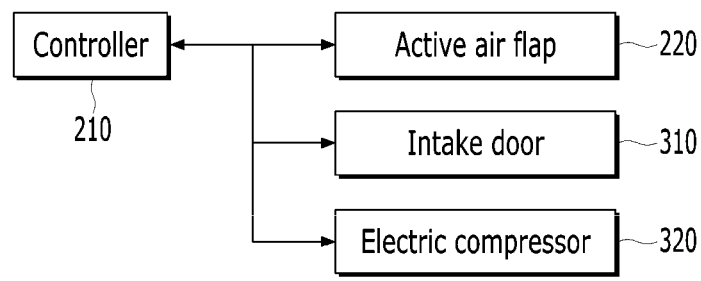
FIG. 2 illustrates a block diagram of a device configured for controlling an air conditioning device of an electrified vehicle to which the method for controlling the air conditioning device of the electrified vehicle illustrated in FIG. 1 is applied.
Figure 3:
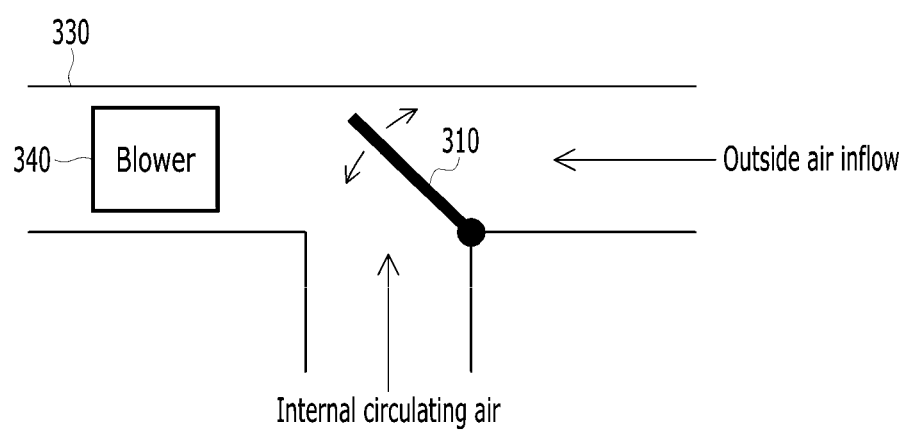
FIG. 3 illustrates an intake door of the air conditioning device illustrated in FIG. 2.

FIG. 1 illustrates a flowchart of a method for controlling an air conditioning device of an electrified vehicle according to various exemplary embodiments of the present disclosure. FIG. 2 illustrates a block diagram of a device configured for controlling an air conditioning device of an electrified vehicle to which the method for controlling the air conditioning device of the electrified vehicle illustrated in FIG. 1 is applied. FIG. 3 illustrates an intake door of the air conditioning device illustrated in FIG. 2.

Referring to FIG. 1 to FIG. 3, in a determination step 110, a controller 210 may determine whether an electric compressor 320 is operated in response to an operation signal of the electric compressor 320 provided in an air conditioner (a cooling device) of an air conditioning device of an electrified vehicle. For example, the electrified vehicle may be a fuel cell electric vehicle (FCEV), an electric vehicle, or a hybrid electric vehicle, and may include an electric motor configured for generating driving force of the vehicle.

As shown in FIG. 2, a control device of the air conditioning device of the electric vehicle may include a controller 210 and an active air flap (AAF) 220.

The controller 210 is an electronic control unit (ECU) which may control an entire operation of the electrified vehicle. For example, the controller 210 may be one or more microprocessors operated by a program or hardware (for example, a microcomputer) including the microprocessor. The program may include a series of instructions for executing the method for controlling the air conditioning device of the electrified vehicle according to the exemplary embodiment of the present disclosure. The instructions may be stored in a memory of the controller 210. The controller 210 may also be referred to as a full automatic temperature control (FATC) device.

The active air flap 220 may be provided at a front side of the electrified vehicle (for example, on a rear surface of a radiator grille), and by being opened, may cool a condenser of the air conditioner (or the refrigerant of the condenser) that condenses the refrigerant (or the coolant/refrigerant) transferred from the electric compressor 320 provided in the air conditioner of the electrified vehicle, and cool a radiator that cools a coolant heated by an engine of the electrified vehicle. The active air flap 220 controls an amount of air entering the radiator grill, and may be driven by an actuator including an electric motor. The air conditioner of the electrified vehicle may include the electric compressor 320, a condenser, an expansion valve, and an evaporator.

An intake door 310 and the electric compressor 320 are included in the air conditioning device of the electrified vehicle, and an operation of the intake door 310 and an operation of the electric compressor 320 may be controlled by the controller 210. The intake door 310 and the electric compressor 320 may be driven by an electric motor.

Referring to FIG. 3, the intake door 310 may block circulation of the inside air of the electrified vehicle in response to a control signal of the controller 210 and may allow the outside air of the vehicle to flow into a cabin of the electrified vehicle through a duct 330, or it may block the inflow of the outside air and may allow the inside air to circulate in the cabin of the electrified vehicle through the duct 330.

A blower 340 is provided in the air conditioning device to allow the outside air or the inside air to circulate, and it may be driven by an electric motor. The condenser and the electric compressor 320 may be provided in the duct 330 at a rear side of the blower 340.

According to step 120 shown in FIG. 1, when the electric compressor 320 is operated, the controller 210 may determine whether the active air flap 220 is closed in response to an operation signal of the active air flap 220. When the active air flap 220 is closed, the pressure (refrigerant pressure) of the refrigerant in the condenser may increase.

According to step 130, when the active air flap 220 is closed, the controller 210 may control the intake door 310 and the electric compressor 320. In more detail, the controller 210 may control (adjust) opening of the intake door 310 to increase an amount of internal circulating air of the air conditioner. When the amount of the internal circulating air of the air conditioner is increased, the cooling efficiency of the air conditioner is increased, so that the controller 210 may decrease a speed of the electric compressor 320. Because the speed of the electric compressor 320 is decreased, the power consumption of the electric compressor 320 may be reduced. That is, a discharging amount of a battery supplying power to the electric compressor 320 is reduced, so that the fuel efficiency (electrical efficiency) of the electrified vehicle may be improved (increased).

According to step 140, after step 130, the controller 210 may determine whether the active air flap 220 is opened in response to an operation signal of the active air flap 220. When the active air flap 220 is opened, the pressure (refrigerant pressure) of the refrigerant in the condenser may be reduced.

When the active air flap 220 is opened, the method for controlling the air conditioning device of the electrified vehicle as a process proceeds to step 150, and when the active air flap 220 is not opened, the method for controlling the air conditioning device of the electrified vehicle as a process may proceed to step 130.

According to step 150, the controller 210 may determine whether the pressure (refrigerant pressure) of the refrigerant in the condenser is less than a reference value. The reference value may be determined by a test (or experiment) as a value for reducing power consumption of the electrified compressor, and may be stored in a memory.

When the pressure (refrigerant pressure) of the refrigerant is less than the reference value, the method for controlling the air conditioning device of the electrified vehicle as a process may be terminated, and when the pressure (refrigerant pressure) of the refrigerant is equal to or greater than the reference value, the method for controlling the air conditioning device of the electrified vehicle as a process may proceed to step 130.

In an exemplary embodiment of the present invention, when the pressure (refrigerant pressure) of the refrigerant is less than the reference value, the controller 210 may be configured not to increase the amount of the internal circulating air of the air conditioner by controlling the opening of the intake door.

The constituent elements, "units", blocks, or modules used in the exemplary embodiments of the present disclosure may be implemented in software such as a task, class, sub-routine, process, object, execution thread or program, which is performed on a certain memory area, hardware such as a field programmable gate array (FPGA) or an application specific integrated circuit (ASIC), and/or a combination of the software and the hardware. The constituent elements, "units", etc. may be included in computer-readable media or some of the constituent elements or the units may be dispersed and distributed in a plurality of computers.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, the controller may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling an air conditioning device of an electrified vehicle, the method comprising:
   determining, by a controller, whether an active air flap is closed in response to an operation signal of the active air flap of the electrified vehicle, when an electric compressor provided in an air conditioner of the air conditioning device of the electrified vehicle is operated;
   when the active air flap is closed, controlling, by the controller, opening of an intake door provided in the air conditioning device to increase an amount of internal circulating air of the air conditioner; and
   when the amount of the internal circulating air of the air conditioner is increased, decreasing, by the controller, a speed of the electric compressor.

2. The method of claim 1, wherein the active air flap is provided at a front side of the electrified vehicle and configured to, by being opened, cool a condenser of the air conditioner condensing a refrigerant transferred from the electric compressor provided in the air conditioner of the electrified vehicle.

3. The method of claim 1,
   wherein a blower is mounted in a duct and the electric compressor is provided in the duct at a rear side of the blower,
   wherein the duct includes a first flow passage allowing an outside air of the electrified vehicle to flow into a cabin of the electrified vehicle and a second flow passage to circulate the internal circulating air in the cabin of the electrified vehicle through the duct, and
   wherein the intake door is configured to selectively open the first flow passage or the second flow passage in accordance with a signal of the controller.

4. The method of claim 1, further including:
   determining, by the controller, whether the electric compressor is operated in response to an operation signal of the electric compressor.

5. The method of claim 4, further including:
   determining, by the controller, whether the active air flap is opened in response to the operation signal of the active air flap; and
   when the active air flap is opened, determining, by the controller, whether a pressure of a refrigerant in a condenser of the air conditioner that condenses the refrigerant transferred from the electric compressor is less than a reference value,
   wherein, when the pressure of the refrigerant is less than the reference value, the method for controlling the air conditioning device of the electrified vehicle is terminated.

6. The method of claim 4,
   determining, by the controller, whether the active air flap is opened in response to the operation signal of the active air flap; and
   when the active air flap is opened, determining, by the controller, whether a pressure of a refrigerant in a condenser of the air conditioner that condenses the refrigerant transferred from the electric compressor is less than a reference value,
   when the pressure of the refrigerant is less than the reference value, not increasing, by the controller, the amount of the internal circulating air of the air conditioner by controlling the opening of the intake door.

7. The method of claim 5, further including:
   when, after controlling the opening of the intake door provided in the air conditioning device to increase the amount of the internal circulating air of the air conditioner, the active air flap is closed or the pressure of the refrigerant is equal to or greater than the reference value, controlling, by the controller, the opening of the intake door provided in the air conditioning device to increase the amount of the internal circulating air of the air conditioner; and
   when the amount of the internal circulating air of the air conditioner is increased, decreasing, by the controller, the speed of the electric compressor.

8. A non-transitory computer readable storage medium on which a program for performing the method of claim 1 is recorded.

9. An apparatus configured for controlling an air conditioning device of an electrified vehicle, the apparatus comprising:
   an active air flap provided at a front side of the electrified vehicle and configured to, by being opened, cool a condenser of an air conditioner condensing a refrigerant transferred from an electric compressor provided in the air conditioner of the electrified vehicle; and
   a controller configured to determine whether the active air flap is closed in response to an operation signal of the active air flap when the electric compressor is operated,
   wherein, when the active air flap is closed, the controller is configured to control opening of an intake door provided in the air conditioning device to increase an amount of an internal circulating air of the air conditioner, and
   when the amount of the internal circulating air of the air conditioner is increased, the controller is configured to decrease a speed of the electric compressor.

10. The apparatus of claim 9, further including:
    a duct; and
    a blower mounted in the duct, wherein the electric compressor is provided in the duct at a rear side of the blower,
    wherein the duct includes a first flow passage allowing an outside air of the electrified vehicle to flow into a cabin of the electrified vehicle and a second flow passage to circulate the internal circulating air in the cabin of the electrified vehicle through the duct, and
    wherein the intake door is configured to selectively open the first flow passage or the second flow passage in accordance with a signal of the controller.

11. The apparatus of claim 9, wherein the controller is configured to determine whether the electric compressor is operated in response to an operation signal of the electric compressor.

12. The apparatus of claim 11, wherein
    the controller is configured to determine whether the active air flap is opened in response to the operation signal of the active air flap,
    when the active air flap is opened, the controller is configured to determine whether a pressure of a refrigerant in the condenser is less than a reference value, and
    when the pressure of the refrigerant is less than the reference value, the controller is configured not to increase the amount of the internal circulating air of the air conditioner by controlling the opening of the intake door.

13. The apparatus of claim 12, further including:
    when, after controlling the opening of the intake door provided in the air conditioning device to increase the amount of the internal circulating air of the air conditioner, the active air flap is closed or the pressure of the refrigerant is equal to or greater than the reference value, the controller is configured to control the opening of the intake door provided in the air conditioning device to increase the amount of the internal circulating air of the air conditioner; and when the amount of the internal circulating air of the air conditioner is increased, the controller is configured to decrease the speed of the electric compressor.

\* \* \* \* \*